United States Patent Office 2,920,952
Patented Jan. 12, 1960

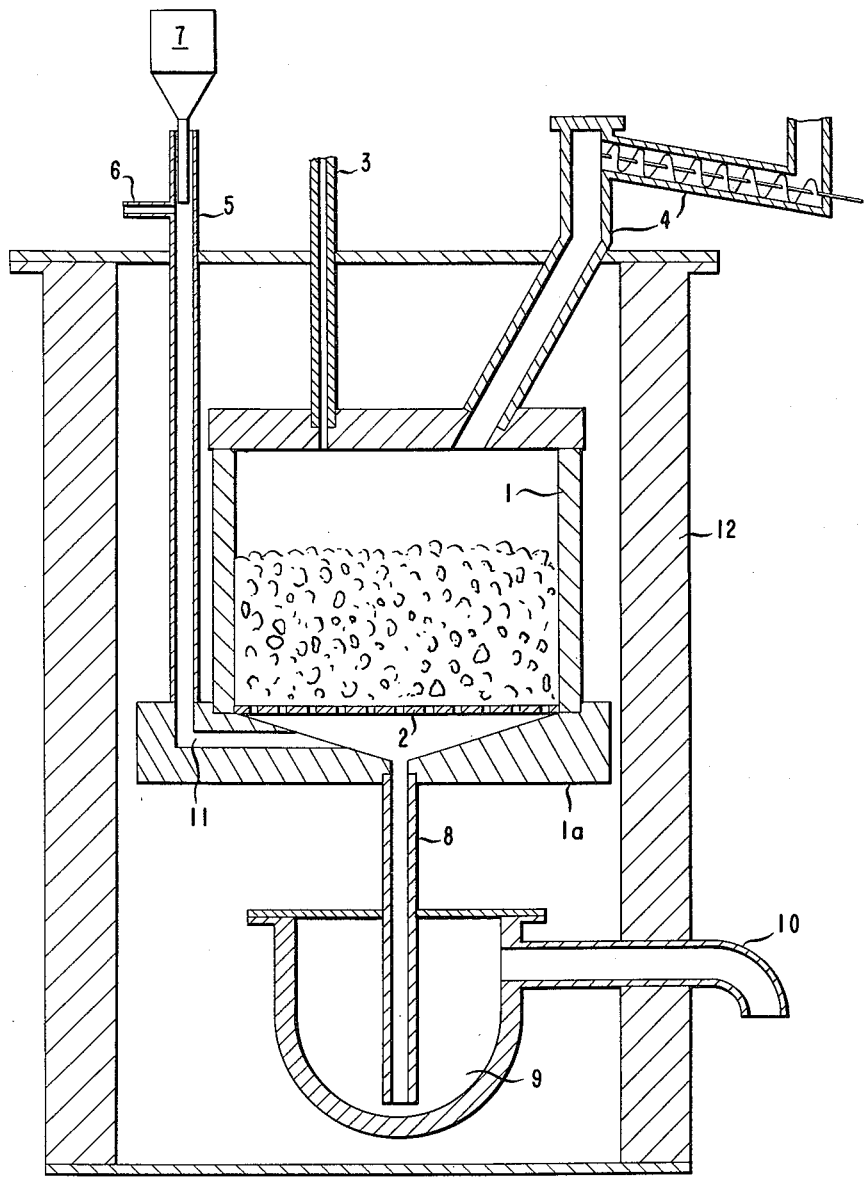
INVENTOR
LEON A. MONSON
BY Francis J. Crowley
ATTORNEY

2,920,952

PROCESS FOR PRODUCING A REFRACTORY METAL SUBHALIDE-ALKALINOUS METAL HALIDE SALT COMPOSITION

Leon A. Monson, Wilmington, Del., assignor to E. I. du Pont de Nemours and Company, Wilmington, Del., a corporation of Delaware Application March 31, 1959, Serial No. 803,182

7 Claims. (Cl. 75—84.5)

This invention relates to an improved process for the production of mixed salt compositions comprising alkalinous metal halides and subhalides of such refractory metals as titanium, niobium, and tantalum. For example, this invention relates to an improved process for the production of titanium subchloride-sodium chloride salt compositions.

Refractory metal subhalide-alkalinous metal halide salt compositions are well known. For instance, titanium subhalide-alkalinous metal halide salt compositions are disclosed in U.S. Patents 2,845,341 to Marshall et al. and 2,765,270 to Brenner et al. Among the methods for preparing such mixed salt compositions are those disclosed in U.S. Patents 2,856,335 to Rick and 2,835,568 to Kingsbury. Such mixed salt compositions are useful as electrolytes in electrolytic cells for the production of these refractory metals, and they are also used in the manufacture of refractory metal by chemical reduction. These uses are respectively illustrated in U.S. Patent 2,848,397 to Reimert and the aforementioned Kingsbury patent.

Titanium subhalide-alkalinous halide salt compositions such as a titanium subchloride-sodium chloride salt composition are usually produced by reacting titanium tetrachloride with less than the stoichiometric amount of sodium required to reduce the titanium tetrachloride to titanium metal. In such a procedure, the sodium is fed to the reaction zone in either the liquid or vapor state, and care must be exercised not to have too great a concentration of sodium metal in any particular portion of the reaction zone, since it will result in reducing the titanium tetrachloride all the way to titanium metal. Such a phenomenon presents quite a problem where either gaseous or liquid sodium is being introduced into the reaction chamber through an inlet. The relatively high concentration of reducing metal near this inlet results in the formation of titanium around the inlet and tends to plug it. Moreover, when a reducing metal such as sodium is used, end product sodium chloride becomes a constituent of the mixed salt composition, and therefore, in such a reduction process it is impossible to directly obtain a mixed salt composition in which there is a high concentration of titanium subhalide. In contrast to these difficulties, the present invention provides a process in which it is possible to produce refractory metal subhalide-alkalinous metal halide salt compositions without necessity for careful control of the concentration of the reactants. Moreover, this invention provides a process for producing such salt compositions without danger of having refractory metal forming at the inlets for the reactants. It is also possible to use the present invention to produce mixed salt compositions having a high concentration of refractory metal subhalides.

This invention is concerned with a process which comprises contacting, in the presence of a molten alkalinous metal halide (e.g., NaCl), a higher halide of a refractory metal (e.g., TiCl$_4$) and a solid silicon-containing composition selected from the group consisting of silicon, titanium silicide, niobium silicide, tantalum silicide, and silicon alloys containing minor amounts of iron aluminum, titanium, niobium and tantalum. The silicon-containing reducing agents are chosen on the basis of their chemical reducing power to remove at least one halogen atom from the refractory metal halide. As a result of contact between the refractory metal higher halide and the silicon-containing reducing agent in the presence of the molten alkalinous metal halide, there are produced refractory metal subhalides which dissolve in the liquid alkalinous metal halide to form a refractory metal subhalide-alkalinous metal halide salt composition. Silicon halide which is a by-product of the reaction is gaseous at the reaction temperatures, and therefore it will pass out of the reaction zone, thus avoiding dilution of the desired salt compositions.

The presence of a molten alkalinous metal halide is essential to the reduction reaction. In the absence of such a salt, the reaction does not proceed to a sufficient extent to be practical. The alkalinous metals are the metals of both the well known alkali metal and alkaline earth metal groups, and they include NaCl, KCl, LiCl, RbCl, CsCl, MgCl$_2$, CaCl$_2$, BaCl$_2$, and SrCl$_2$, the corresponding fluorides such as NaF, SrF$_2$, KF, and CaF$_2$, and also the corresponding bromides and iodides. Mixtures of these salts can also be utilized. In fact, it is recommended that when the high-melting-point alkalinous halides, such as the fluorides, are used, they should be in admixture with other alkalinous halides having a relatively low melting point.

The refractory metal halides used in this invention are the higher halides of Nb, Ta, and Ti. Such higher halides may be defined as those in which the valence of the refractory metal is greater than 3, i.e., the titanium tetrahalides and preferably the pentahalides of niobium and tantalum. These halides boil many degrees below the melting point of the alkalinous metal salt, and therefore such refractory metal halides, preferably the chlorides, are usually fed to the reaction zone as vapors. However, they may be handled and introduced as liquid or even solids, whereupon they become vaporized on entering the hot zone containing the molten alkalinous metal halide. One of the novel and important features of this invention is the fact that the concentration and feed rate for the refractory metal halide does not require careful control. If it is fed faster than it can be consumed, it will simply be carried off with the gaseous silicon halide by-product. There is no danger of any appreciable amount of refractory metal being formed as a result of having too high a concentration of reducing agent.

As the reaction proceeds, the lower chlorides or other lower halides form and dissolve in the salt, and this usually results in a further lowering of the melting point. The lower limit of operable temperature is therefore the melting point of the particular salt phase which may be as low as 450° C. in some cases, the exact temperature depending upon its composition. The upper limit on temperature is that at which the lower refractory metal halide reaction products vaporize. This temperature will vary depending upon the refractory metal involved. However, temperatures up to 1000° C. are usually practical. A preferred range lies between about 600° C. and 900° C. provided, however, that the temperature of the salt bath is high enough to prevent freezing, except perhaps at the walls of the container. Pressures are not critical. However, a pressure of about 1 atmosphere or slightly above is preferred. The reaction is usually carried out in a closed system constructed of materials which are corrosion-resistant to the materials used in the reaction. Also, the system should be free of air and moisture. This may be accomplished by conventional procedures which include the use of a gas purge prior to initiating the reaction or, alternatively, the maintenance of an inert gas blanket prior to and throughout the operation of the invention.

It will be noted that the silicon used to accomplish the partial reduction does not need to be pure silicon. Fortunately, in this process, readily available, impure products may be used. These include silicon containing several percent of aluminum, ferrosilicon, titanium silicon alloys, titanium silicide, etc. Any iron from ferrosilicon and the usual amounts of carbon, oxygen, or nitrogen in these silicon-containing substances can be tolerated since they can be easily removed from the salt composition by the process of U.S. Patent 2,845,341. Any small amount of aluminum which might be present in the silicon will alloy with the refractory metal if the mixed salt composition is subsequently reduced to such refractory metal. In certain instances, this will be an advantage since a considerable part of the titanium market is in alloys containing minor amounts of aluminum. These silicon reducing agents may be used in the form of powders, grains, lumps, or crystals, and if desired, agitation may be employed to improve the contact between these solids and the salt melt and the halides to be reduced.

The attached drawing shows one form of apparatus which can be used for carrying out the process of this invention. The essential parts of this apparatus are summarized as follows:

1. Reactor wall
1a. Reactor bottom
2. Perforated bottom
3. Vent and thermocouple port
4. Screw feeder for Si and salt
5. Inlet for refractory metal halide
6. Argon purge connection
7. Feeding device
8. Reactor discharge pipe
9. Molten salt trap
10. Outlet for product
11. Vaporizing area
12. Furnace enclosure In the attached drawing, the furnace enclosure 12 serves as a temperature controlling device which maintains the reaction chamber 1, the trap 9, and the associated pipes at operating temperature. The reaction chamber 1 is closed at the top and provided with a vent pipe 3 through which by-product $SiCl_4$ can escape from the reaction zone. Vent pipe 3 can also serve as a port for inserting a thermocouple or a probe for determining the bed level. If desired, vent pipe 3 may be jacketed to condense and return reactant metal halides while permitting $SiCl_4$ to escape. Alternatively, member 3 may be a fractionating column. The supporting bottom 2 of the chamber is perforated to permit drainage of the end product from the reaction zone and to allow distributed upward entry of the metal chloride vapor which enters below the perforated bottom from the hot section of the inlet pipe 11. The molten salt product collects in the conical chamber and flows down the pipe 8, through trap 9 to the exit 10 where it may be collected in vessels or piped to other locations for further reduction, purification, etc. The liquid trap 9 serves to close the outlet and prevent loss of metal chloride vapor through 10. The metal chloride to be reduced is fed through a suitable mechanism indicated by member 7. When $TiCl_4$ is being reduced, member 7 would be a liquid feeder capable of controlling flow at a desired rate. The liquid $TiCl_4$ would drop down pipe 5, within the furnace, and become vaporized by the time it passes through section 11. $NbCl_5$ and $TaCl_5$ could also be fed as liquids by running feeder 7 at elevated temperature. However, since $NbCl_5$ melts at 212° C. and $TaCl_5$ at 207° C., they may be fed through member 7 as solids. Screw feeder 4 serves to supply a mixture of solid salt, e.g., NaCl, and silicon reducing agent at predetermined rates. Alternatively, the silicon reducing agent could be fed by any type of solids feeder while the salt would be introduced in the molten state through other suitable means, such as through vent pipe 3. When feeding solids, it is feasible to cool the upper portions of the inlet to prevent premature melting. Argon purging gas is supplied at 6 and vented at 3 when necessary. The reaction by-product $SiCl_4$ is removed through 3, whereupon it may be condensed and recovered.

For a clearer understanding of the invention, the following specific examples are given. These examples are intended to be merely illustrative of the invention and not in limitation thereof.

*Example I*

An apparatus constructed substantially as shown in the drawing was used for the reduction of niobium pentachloride. A high nickel alloy jacketed condenser was mounted on top of the vent tube 3 and a supply of steam at 220° C. provided for the jacket. The reaction chamber and adjacent pipes were constructed of graphite. The reaction chamber was charged about ⅔ full of a granular 1 to 1 by weight mixture of low iron ferrosilicon (95% Si) and relatively pure silicon scrap (99% Si). The chamber was purged with argon and then the furnace turned on. When a steady temperature of about 850° C. was reached, an equimolar mixture of dry sodium and potassium chlorides was fed into the reaction chamber through the screw conveyor 4 until sufficient molten salts had formed to run into and close the lower liquid trap 9. At this stage the reactant feed was begun. A mixture of ferrosilicon and scrap silicon of the same composition as that used to charge the reaction chamber, but of about 20 mesh size, was fed in with the salts. At the same time previously melted niobium pentachloride was fed through the inlet 5 to zone 11 where it vaporized prior to passing into the bottom of the reactor and up through the porous plate. The feeds were approximately set so that the weights of $NbCl_5$, Si, and mixed salts introduced per unit of time were respectively 30, 20, and 115. The niobium feed rate was controlled so that not more than a small amount of niobium chloride, as observed through a sight glass at the top of the condenser, could be seen condensing. Further control was obtained by watching the depth of solids in the reaction chamber by means of a probe. The screw speed in the conveyor 4 was adjusted to keep the solids level more or less constant. In this way it was possible to follow the progress of the reaction and keep production rates commensurate with the inherent capacity of the apparatus. The $SiCl_4$ by-product escaped through the hot condenser and was condensed elsewhere. Measurement of the rate of formation of this by-product afforded another means of following and controlling the process. About 200 pounds of products were collected and cooled in the product receivers connected to trap discharge pipe 10. The cooled salt cake was sampled and analyses of the samples showed a niobium content ranging from 14–16% by weight with an average Nb valence of 2.68. This corresponds to $Nb_3Cl_8$ which appears to be soluble in the molten salts since it could be drawn through a fine metallic filter to remove particles of Si, etc., without substantial loss in Nb content. This product is suitable for further reduction, either electrolytically or with an active metal such as sodium, to give an exceptionally pure, ductile niobium metal.

*Example II*

A silica vessel having an internal diameter of 1½ inches was set up in an electrically heated furnace. This vessel had a thermocouple against its side, and it was provided with a top opening for the addition of solids and venting of gases and a bottom inlet for gases.

The bottom inlet was supplied through a coil of silica tubing within the furnace, thus producing a means for heating and vaporizing materials being added.

Six hundred grams of dry sodium chloride and one hundred grams of 28 mesh commercial silicon (97% Si—2.6% Al) were mixed and placed in the tube. The furnace temperature was then raised to melt the salt and during the heating a slow current of argon was passed up through the vessel to displace air. At 850° C. the addition of $TiCl_4$ through the vaporizing coil was begun at the rate of 5 grams per minute. 1320 grams of $TiCl_4$ were bubbled into the salt bath and during this period the vessel temperature was reduced to 700° C., and 95% of the $TiCl_4$ added was partially reduced. The product salt mixture contained 19.8% titanium having an average valence of 2.9.

As previously mentioned, it is necessary to carry out the reduction reaction of this invention in the presence of a molten alkalinous metal halide. A preferred procedure is to have the silicon immersed in this molten halide, but there are other means for maintaining the presence of this salt during the reduction reaction. For example, molten salt could be sprayed upon the solid silicon while it is in contact with the refractory metal halide. It is also contemplated to utilize an alkalinous metal halide which has been previously used as a solvent medium for refractory metal subhalides. Such a salt is a by-product when the product of this invention is further reduced to metal, and it usually contains a few percent of the lower halides of the refractory metals. The reuse of such a material is an advantage from the standpoint of economy, and the presence of the lower halides also provides a starting salt medium of somewhat lower melting point. The process of this invention is particularly advantageous in this regeneration of spent salts because the volatile by-product, $SiCl_4$, does not dilute the salt during regeneration.

Since it is obvious that many changes and modifications can be made in the above-described details without departing from the nature and spirit of the invention, it is to be understood that the invention is not to be limited to said details except as set forth in the appended claims.

I claim:

1. A process for producing a refractory metal subhalide-alkalinous metal halide salt composition which comprises contacting, in the presence of a molten alkalinous metal halide, a higher halide of a refractory metal selected from the group consisting of titanium, niobium, and tantalum with a solid silicon-containing compound selected from the group consisting of silicon, titanium silicide, niobium silicide, tantalum silicide, and silicon alloys containing minor amounts of iron, aluminum, titanium, niobium and tantalum.

2. A process for producing a refractory metal subhalide-alkalinous metal halide salt composition which comprises contacting a higher halide of a refractory metal selected from the group consisting of titanium, niobium, and tantalum with solid silicon in the presence of a molten alkalinous metal halide.

3. A process for producing a refractory metal subchloride-sodium chloride salt composition which comprises contacting a higher chloride of a refractory metal selected from the group consisting of titanium tetrachloride, niobium pentachloride, and tantalum pentachloride with solid silicon in the presence of molten sodium chloride.

4. The process of claim 3 in which the refractory metal halide is titanium tetrachloride.

5. The process of claim 3 in which the refractory metal halide is niobium pentachloride.

6. The process of claim 3 in which the refractory metal halide is tantalum pentachloride.

7. A process for producing a refractory metal subhalide-alkalinous metal halide salt composition which comprises contacting in the presence of a molten alkalinous metal halide a higher halide of a refractory metal selected from the group consisting of titanium, niobium, and tantalum with a silicon-containing composition having sufficient chemical reducing power to remove at least one halogen atom from the refractory metal halide.

No references cited.